April 15, 1930.  E. H. WIEGAND  1,754,923
FRUIT GRADING MACHINE
Filed Dec. 11, 1928
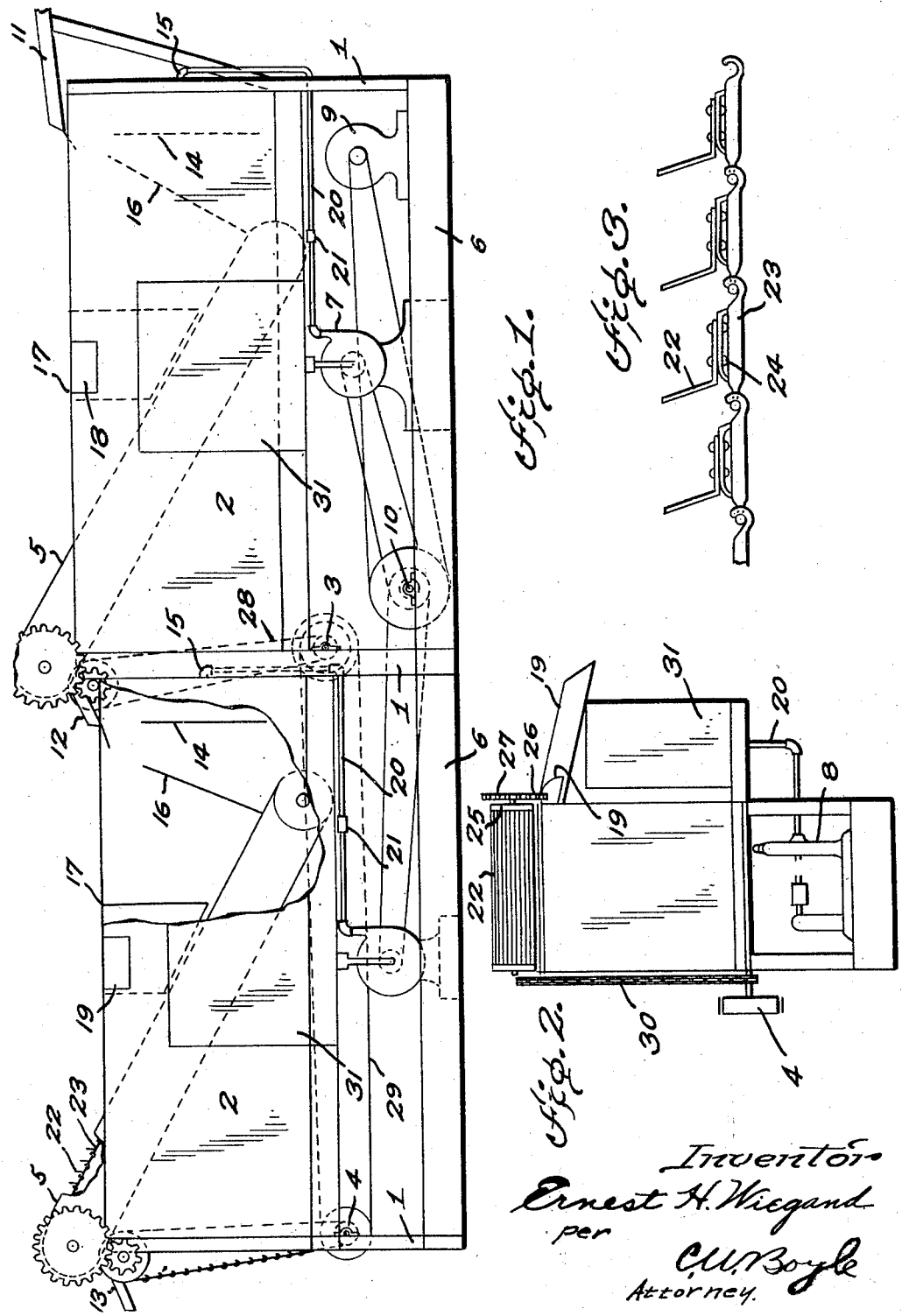
Inventor
Ernest H. Wiegand
per
C. U. Boyle
Attorney.

Patented Apr. 15, 1930

1,754,923

UNITED STATES PATENT OFFICE

ERNEST H. WIEGAND, OF CORVALLIS, OREGON, ASSIGNOR, BY MESNE ASSIGNMENTS, TO THE CITIZENS OF THE UNITED STATES FOR THEIR FREE USE AND ENJOYMENT

FRUIT-GRADING MACHINE

Application filed December 11, 1928. Serial No. 325,350.

(GRANTED UNDER THE ACT OF MARCH 3, 1883, AS AMENDED APRIL 30, 1928; 370 O. G. 757)

This application is made under the act approved April 30, 1928, and the invention herein described if patented may be manufactured and used by or for the Government for governmental purposes and any person in the United States, either in public or in private work may use the invention without the payment to me of any royalty thereon.

This invention is related to fruit graders and has particular reference to novel methods and apparatus whereby fruit such as prunes, oranges, lemons, etc. is separated into quality grades by flotation according to their density or maturity.

Up to the present time numerous machines have been devised for separating the fruit according to size. This machine on the contrary separates according to the density or maturity of the fruit. Solutions of greater density than water for separating fruits into their respective quality and grades, are employed by me. The solutions are: sucrose, glucose, levulose, maltose, sodium chloride, calcium chloride, molasses, fruit juices, or other saccharide. Green fruit will float on the surface of such solution, the riper fruit sinking to the bottom. The fruit thus sinking is then subjected to a solution of a density approximately 10 degrees heavier and the separation of the mature from the less mature will again occur by the heavier more mature fruit sinking and the lighter immature fruit floating. Four or five separations can be made by starting as is indicated with Italian prunes at 30° then 40°, 50° and 60° solutions. (Salometer.) Italian prunes subjected to the following solutions gave the results indicated in the table below.

| Solution density | Fruit juice density—Balling hydrometer |
|---|---|
| 40 degree (salometer) salt | Floating fruit 22.4% soluble solids. |
| 50 degree (salometer) salt | Floating fruit 23.2% soluble solids. |
| 60 degree (salometer) salt | Floating fruit 26.0% soluble solids. |
| 60 degree (salometer) salt | Sinking fruit 34.0% soluble solids. |

In each of the above cases the results indicate the increased maturity by the increased percentage of solids in solution. The fruit in this case was first immersed in a 40 degree (salometer) salt solution. The fruit floating to the surface was tested by extracting the juice. This juice tested for soluble solids with a Balling hydrometer indicated 22.4%. The fruit sinking to the bottom of the tank was immersed in a second tank containing a solution of salt of 50 degree density (salometer). The fruit floating in this solution was slightly more mature as indicated by the Balling hydrometer when the juice was tested, showing 23.2% soluble solids. The fruit sinking in the 50 degree solution was then immersed in a 60 degree (salometer) salt solution. The fruit floating in this solution was more mature than the fruit floating in 50 degree salt solution as was indicated by the density of the juice of the fruit which indicated 26% solids in solution. The fruit sinking in the 60 degree salt solution was the most mature and the juice of the fruit indicated a density of 34% solids in solution. It can be seen from the above that the gradual increase in soluble solids and increase in weight of fruit as was evidenced by its sinking in the more dense solutions indicates its increasing maturity. The fruit thus separated indicated by appearance its increase in maturity by softer texture, change in flesh color and increase in color of the skin.

For a better understanding of my invention reference may be had to the accompanying drawings in which:

Figure 1 is a side elevation showing a section cut away giving detail view of portion of interior tank construction.

Figure 2 is end elevation view of my machine.

Figure 3 is detail view of chain conveyor flights.

Referring now to the accompanying drawing (Fig. 1) the standards 1 support the main body of the machine 2, and at the same time provide supports for the counter shafts 3 and 4, driving the conveyor 5. On the base of the machine 6 are located the pumps 7 and 8, and motor 9 and main shaft 10. The main shaft 10 is driven by motor 9 which in turn drives the two pumps 7 and 8 by belt and the counter shaft 3 by chain. The tanks 2 comprising the main part of the machine are equipped with a feeding platform 11, conveyors 5, and delivery spouts 12 and 13. At the forward end of each tank is deflecting partition 14 for deflecting solution coming into the main tank through pipe inlet 15. The deflecting apron 16 guides the heavier fruit into conveyor 5. The deflecting apron 17 guides fruit out through delivery spouts 18 and 19 with solution.

The rotary pumps 7 and 8 located beneath each machine are for the purpose of creating overflow and current to convey the lighter fruit out of the machine. These pumps are equipped with pipes 20 (Figs. 1 and 2) for conducting water from overflow on the side of the machine to and from pumps 7 and 8 through check valves 21 into main tank.

The conveyors 5 are constructed with flights 22 made of metal bent at 45 degrees angle (Fig. 3), to assist in draining off solution from the fruit. These flights are fastened on chain 23 by rivets 24. The ends of flights 22 are guarded by metal housing 25 (Fig. 2) to prevent fruit coming in direct contact with chain 23 (Fig. 3). The whole conveyor is driven through gears 26 and 27 (Fig. 2) from counter shaft 3 by chain 28 (Fig. 1) on first tank and through belt 29 to counter shaft 4 through chain 30 on second tank (Fig. 2).

Having now described the principal features of my invention, the operation thereof is as follows:

The fruit to be graded is fed from feeding platform 11 into solution in tanks 2. The solution in these tanks having a density greater than the green fruit, the separation takes place as follows:

The heavy fruit is guided down the deflecting apron 16 to the conveyor 5 which extends to the bottom of the tank 2. From there it is lifted by the conveyor 5 out of the solution and dumped into the second tank which contains a solution of greater density for the second separation.

The fruit which floats in the first tank because of its extreme greenness or lighter density is conveyed to the outlet spout by a current supplied by the pump 7 which furnishes sufficient solution to float the fruit through the outlet spouts 18, 19. The principal feature in this flotation is to have the solutions as quiet as possible to prevent disturbing the fruit of heavier density while in the act of sinking onto metal conveyor 5 under the surface. To quiet the solution the deflecting partition 14 directly opposite the inlet pipe 15 where the solution is pumped back from the overflow tanks 31 breaks up the disturbing currents and permits the solution to travel more quietly over the top of the deflecting partition 14 to convey the light fruit to the outlet spout 18. The surplus solution is cared for by passing to the bottom of the tank beneath the deflector 14. The conveyors 5 are so operated that the travel is sufficiently slow to permit draining of the fruit. The second tank 2 is identical with the first with the exception that solutions of greater density can be used in it. If it is desired to divide the fruit into a greater number of quality grades, additional tanks can be supplied in which solutions of greater density can be placed.

So far as I am aware a machine wherein the fruit is graded by subjecting it to solutions of various densities is new in this art. The machine described is capable of various modifications.

What I claim is:

A fruit grading machine, comprising tanks in series containing solutions of greater density than the density of water, means for recirculating said solutions in each of said tanks, means for minimizing the agitation of said solutions, means for introducing fruit into the first of said tanks and means for conveying the fruit from the first of said tanks to the other tank or tanks in the series.

ERNEST H. WIEGAND.